(12) United States Patent
Iwanaga et al.

(10) Patent No.: US 12,264,753 B2
(45) Date of Patent: Apr. 1, 2025

(54) SOLENOID VALVE

(71) Applicant: EAGLE INDUSTRY CO., LTD., Tokyo (JP)

(72) Inventors: Hiroyuki Iwanaga, Tokyo (JP); Tadanobu Kawato, Tokyo (JP); Masaki Hoshi, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 18/034,662

(22) PCT Filed: Oct. 25, 2021

(86) PCT No.: PCT/JP2021/039229
§ 371 (c)(1),
(2) Date: Apr. 28, 2023

(87) PCT Pub. No.: WO2022/097514
PCT Pub. Date: May 12, 2022

(65) Prior Publication Data
US 2023/0400117 A1 Dec. 14, 2023

(30) Foreign Application Priority Data
Nov. 5, 2020 (JP) .................................. 2020-185376

(51) Int. Cl.
*F16K 31/06* (2006.01)
*H01F 7/08* (2006.01)

(52) U.S. Cl.
CPC ......... *F16K 31/0675* (2013.01); *H01F 7/081* (2013.01); *H01F 2007/083* (2013.01)

(58) Field of Classification Search
CPC . F16K 31/0675; H01F 2007/083; H01F 7/081
(Continued)

(56) References Cited

U.S. PATENT DOCUMENTS

| 1,049,845 A | 1/1913 | Geissinger ............ F16K 31/046 |
| 2,650,617 A | 9/1953 | Wasser .................. H01F 7/1607 |

(Continued)

FOREIGN PATENT DOCUMENTS

| CN | 205190900 | 4/2016 | ............. F16K 31/06 |
| JP | 55-65407 | 5/1980 | ............... H01F 7/13 |

(Continued)

OTHER PUBLICATIONS

Translation (Year: 2013).*
(Continued)

*Primary Examiner* — William M McCalister
(74) *Attorney, Agent, or Firm* — HAYES SOLOWAY P.C.

(57) ABSTRACT

A solenoid valve includes: a movable iron core; a solenoid molded body disposed outside the movable iron core in a radial direction and including a coil; a solenoid casing accommodating the movable iron core and the solenoid molded body; a fixed iron core disposed inside the solenoid molded body in the radial direction to generate a magnetic force between the fixed iron core and the movable iron core when the coil is energized; and a valve unit that opens and closes a flow passage in accordance with a movement of the movable iron core. A magnetic material separate from the solenoid casing is disposed at an axial end portion of the coil outside the solenoid casing.

16 Claims, 7 Drawing Sheets

(58) Field of Classification Search
USPC .................................................. 251/129.01
See application file for complete search history.

(56) References Cited

U.S. PATENT DOCUMENTS

| | | | | |
|---|---|---|---|---|
| 2,654,393 | A | | 10/1953 | Ghormley ............. F16K 31/408 |
| 2,700,397 | A | | 1/1955 | Compton ............. F16K 31/408 |
| 2,999,192 | A | | 9/1961 | Lambert ............ F16K 31/0655 |
| 3,446,473 | A | | 5/1969 | Barker ................ F16K 31/0651 |
| 3,462,116 | A | | 8/1969 | Wright ................ F16K 31/0651 |
| 3,827,672 | A | | 8/1974 | Stampfli ............... H01F 7/1607 |
| 3,926,405 | A | | 12/1975 | Arnold ............... F16K 31/0655 |
| 4,305,566 | A | | 12/1981 | Grawunde ............ F16K 31/406 |
| 4,319,211 | A | | 3/1982 | Ueda et al. ............... H01F 7/08 |
| 4,790,345 | A | * | 12/1988 | Kolchinsky ......... F16K 31/0668 |
| | | | | 335/262 |
| 4,971,116 | A | | 11/1990 | Suzuki .............. G05D 16/2024 |
| 5,076,323 | A | | 12/1991 | Schudt ................ F16K 31/0637 |
| 5,413,308 | A | | 5/1995 | Hayes ................ F16K 31/0686 |
| 5,651,530 | A | | 7/1997 | Krimmer ............... H01F 7/1607 |
| 5,848,613 | A | * | 12/1998 | Sakaguchi .......... F16K 31/0613 |
| | | | | 137/625.65 |
| 6,129,062 | A | * | 10/2000 | Koda .................. F01L 1/34406 |
| | | | | 123/90.37 |
| 6,293,513 | B1 | | 9/2001 | Birkelund ............. F16K 31/408 |
| 6,315,268 | B1 | | 11/2001 | Cornea .................... H01F 7/081 |
| 6,367,434 | B1 | | 4/2002 | Steigerwald ........ F15B 13/0821 |
| 6,619,615 | B1 | | 9/2003 | Mayr ..................... H01F 7/1607 |
| 6,634,381 | B2 | * | 10/2003 | Matsusaka .......... F16K 31/0624 |
| | | | | 137/625.65 |
| 6,811,137 | B2 | * | 11/2004 | Hirata ................. F16K 31/0668 |
| | | | | 251/129.01 |
| 7,686,038 | B2 | | 3/2010 | Chavanne ........... F16K 31/0631 |
| 8,134,436 | B2 | | 3/2012 | Yasoshima .............. H01F 7/127 |
| 8,998,167 | B2 | | 4/2015 | Leidig ................. F16K 31/0655 |
| 9,464,728 | B2 | | 10/2016 | Herrmann ................ F16K 31/00 |
| 11,072,315 | B2 | | 7/2021 | Edelmann ............. F16K 39/024 |
| 11,320,061 | B2 | * | 5/2022 | Nishimura .......... F16K 31/0655 |
| 2002/0007549 | A1 | | 1/2002 | Oishi et al. ...................... 29/596 |
| 2005/0001189 | A1 | | 1/2005 | Takamatsu .......... F16K 31/0655 |
| 2006/0243938 | A1 | | 11/2006 | Ishibashi et al. ........ 251/129.15 |
| 2010/0326552 | A1 | | 12/2010 | Suzuki .................. F16B 13/0402 |
| 2011/0115587 | A1 | | 5/2011 | Ishibashi ........................ 335/255 |
| 2011/0128104 | A1 | | 6/2011 | Yasoshima ................ H01F 3/00 |
| 2012/0126158 | A1 | | 5/2012 | Yasoshima et al. ..... 251/129.15 |
| 2013/0181795 | A1 | | 7/2013 | Mitsumata et al. .... H01F 7/081 |
| 2013/0200283 | A1 | | 8/2013 | Speer ...................... F16K 31/08 |
| 2013/0306894 | A1 | | 11/2013 | Wei ..................... F16K 31/0655 |
| 2016/0329143 | A1 | | 11/2016 | Irie et al. ................ H01F 7/081 |
| 2017/0248262 | A1 | | 8/2017 | Taniguchi ............ F16L 37/146 |
| 2018/0180194 | A1 | | 6/2018 | Lee et al. ............... F16K 31/06 |
| 2018/0372129 | A1 | | 12/2018 | Kato et al. .............. F15B 13/04 |
| 2020/0278045 | A1 | | 9/2020 | Nishimura et al. ......................... |
| | | | | F16K 31/0675 |

FOREIGN PATENT DOCUMENTS

| | | | |
|---|---|---|---|
| JP | 2-92907 | 7/1990 | ............. H01F 7/16 |
| JP | 7-27246 | 1/1995 | ............. F16K 31/06 |
| JP | 9-250650 | 9/1997 | ............. F16K 31/06 |
| JP | 11-37333 | 2/1999 | ............. F16K 31/08 |
| JP | 2002-27723 | 1/2002 | ............. H02K 33/02 |
| JP | 2002-188747 | 7/2002 | ............. F16K 31/06 |
| JP | 2006-307984 | 11/2006 | ............. F16K 31/06 |
| JP | 2007-211857 | 8/2007 | ............. F16K 31/06 |
| JP | 2010-106899 | 5/2010 | ............. F16K 31/06 |
| JP | 2010-223279 | 10/2010 | ............. F16K 31/06 |
| JP | 2011-108781 | 6/2011 | ............. H01F 7/16 |
| JP | 2011-228568 | 11/2011 | ............. H01F 7/16 |
| JP | 2012-122609 | 6/2012 | ............. F16K 31/06 |
| JP | 2013-144999 | 7/2013 | ............. F16K 31/06 |
| JP | 2013144999 A | * 7/2013 | ............. H01F 7/081 |
| JP | 2014-110372 | 6/2014 | ............. H01F 7/16 |
| JP | 2014-232768 | 12/2014 | ............. H01F 7/16 |
| JP | 2015-75165 | 4/2015 | ............. F16K 31/06 |
| JP | 2015-517631 | 6/2015 | ............. H01F 7/16 |
| JP | 2015-137757 | 7/2015 | ............. F16K 31/06 |
| JP | 2015-195301 | 11/2015 | ............. H01F 7/16 |
| JP | 2016-211657 | 12/2016 | ............. F16K 11/07 |
| JP | 2017-157791 | 9/2017 | ............. H01K 42/02 |
| JP | 2019-7572 | 1/2019 | ............. F16K 31/06 |
| WO | WO2015115298 | 8/2015 | ............. H01K 7/06 |
| WO | WO2019017271 | 1/2019 | ............. F16K 31/06 |
| WO | WO2019102908 | 5/2019 | ............. F16K 31/06 |
| WO | WO2020110881 | 6/2020 | ............. H01F 7/16 |
| WO | WO-2020110881 A1 | * 6/2020 | ............. F16K 31/06 |

OTHER PUBLICATIONS

Translation (Year: 2020).*
International Search Report and Written Opinion issued in PCT/JP2018/042066, dated Feb. 5, 2019, with English translation, 18 pgs.
International Preliminary Report on Patentability issued in PCT/JP2018/042066, dated May 26, 2020, English translation, 9 pages.
International Search Report and Written Opinion issued in PCT/JP2018/042065, dated Feb. 5, 2019, with English translation, 16 pgs.
International Preliminary Report on Patentability issued in PCT/JP2018/042065, dated May 26, 2020, English translation, 8 pgs.
International Search Report and Written Opinion issued in PCT/JP2020/030962, dated Nov. 2, 2020, with English translation, 14 pgs.
International Preliminary Report on Patentability issued in PCT/JP2020/030962, dated Mar. 10, 2022, English translation, 6 pgs.
International Search Report and Written Opinion issued in PCT/JP2021/039229, dated Nov. 16, 2021, with English translation, 13 pgs.
International Preliminary Report on Patentability issued in PCT/JP2021/039229, dated May 19, 2023, English translation, 6 pgs.
Official Action issued in related U.S. Appl. No. 16/754,734, dated Mar. 30, 2022, 29 pages.
Official Action issued in related U.S. Appl. No. 16/756,115, dated Sep. 15, 2021, 12 pages.
Official Action issued in related U.S. Appl. No. 16/756,115, dated Apr. 1, 2021, 9 pages.
Official Action issued in related U.S. Appl. No. 17/636,784, dated Mar. 30, 2023, 9 pages.
Chinese Official Action issued in corresponding Chinese Application Serial No. 201880065703.9, dated Jul. 14, 2021 (12 pages) with translation.
Chinese Official Action issued in corresponding Chinese Application Serial No. 201880065703.9, dated Jan. 27, 2022 (13 pages) with translation.
Chinese Official Action issued in Chinese Patent Application Serial No. 201880065470.2, dated Dec. 8, 2021 (12 pages) with translation.
Chinese Official Action issued in Chinese Patent Application Serial No. 201880065470.2, dated Jul. 2, 2021 (10 pages) with translation.
Japanese Official Action issued in Japanese Patent Application Serial No. 2019-555271, dated Mar. 10, 2022 (6 pages) with translation.
International Search Report, Written Opinion and International Preliminary Report on Patentability issued in PCT/JP2022/004923, dated Mar. 15, 2022, English translation, 24 pgs.
European Official Action issued in European Patent Application Serial No. 21889067.1, dated Aug. 6, 2024 (9 pages).

* cited by examiner

SOLENOID VALVE

TECHNICAL FIELD

The present invention relates to a solenoid valve that is used, for example, for hydraulic control of a hydraulic circuit.

BACKGROUND ART

A solenoid valve for hydraulic control includes a solenoid molded body including a coil; a fixed iron core that is a stator having a cylindrical shape; and a movable iron core that is a plunger having a columnar shape. The solenoid molded body is accommodated inside a solenoid casing that is a yoke made of a magnetic body. The fixed iron core is disposed inside the solenoid molded body. The movable iron core is disposed inside the stator. A solenoid valve in which when a coil is energized, a magnetic path is formed by the yoke, the stator, and the plunger, and a magnetic force is generated between the stator and the plunger to move the plunger in an axial direction inside the stator has been known (for example, refer to Patent Citation 1).

Generally, the solenoid casing of such a solenoid valve is formed into a bottomed tubular shape by pressing a metal plate in a manufacturing process. In such a manner, a tubular portion and a bottom portion of the solenoid casing are formed to be continuous with each other, so that a magnetic path can be formed along a magnetic field forming a closed curved surface with respect to a tubular portion of the coil. Therefore, the stator and the plunger can be effectively magnetized with minimum loss. In addition, a magnetic flux density of the coil of such a solenoid valve is proportional to an electric current value for energization, and the electric current value with which the coil is energized is adjusted to obtain a thrust to move the plunger at a required stroke.

CITATION LIST

Patent Literature

Patent Citation 1: JP 2015-137757 A (PAGE 5 and FIG. 1)

SUMMARY OF INVENTION

Technical Problem

A saturation magnetic flux density of a magnetic path is determined by a cross-sectional area, and in the solenoid valve as in Patent Citation 1, the bottom portion of the solenoid casing at an axial end portion on a plunger side of the coil is formed in a thin plate shape. In addition, the bottom portion has a shape of which the diameter decreases in a radially inward direction and of which the cross-sectional area gradually decreases. Therefore, the saturation magnetic flux density of the bottom portion gradually decreases in the radially inward direction. For this reason, particularly in a case where the plunger requires a large thrust, when a high electric current is applied to the coil, magnetic fluxes generated by the coil exceed a saturation magnetic flux density of a magnetic path, and the applied electric current value and the thrust of the plunger are not proportional to each other, which is a problem.

The present invention is conceived in view of such a problem, and an object of the present invention is to provide a solenoid valve capable of obtaining a thrust of a movable iron core that is proportional to an electric current value applied to a coil.

Solution to Problem

In order to solve the foregoing problem, a solenoid valve according to the present invention includes: a movable iron core that is movable in an axial direction; a solenoid molded body disposed outside the movable iron core in a radial direction and including a coil; a solenoid casing that accommodates the movable iron core and the solenoid molded body; a fixed iron core disposed inside the solenoid molded body in the radial direction to generate a magnetic force between the fixed iron core and the movable iron core when the coil is energized; and a valve unit that opens and closes a flow passage in accordance with a movement of the movable iron core, wherein a magnetic material separate from the solenoid casing is disposed at an axial end portion of the coil outside the solenoid casing. According to the aforesaid feature of the present invention, the magnetic material is disposed at the axial end portion on a movable iron core side of the coil outside the solenoid casing having, for example, a bottomed structure in which a saturation magnetic flux density gradually decreases in a radially inward direction, so that the cross-sectional area of a magnetic path at that location can be expanded. Since more magnetic fluxes can be induced from the magnetic material to the movable iron core side, and the magnetic fluxes that increase according to an electric current value applied to the coil can be effectively used to magnetize the fixed iron core and the movable iron core, a thrust of the movable iron core that is proportional to the electric current value can be obtained. In addition, the magnetic material that is a separate body is disposed outside the solenoid casing, and the magnetic material is changed according to a maximum value of an electric current applied to the coil, so that the magnetic flux density can be adjusted without changing a shape of the solenoid casing.

It may be preferable that an annular step portion recessed in a radially inward direction is formed in an outer portion of the solenoid casing at the axial end portion of the coil, and the magnetic material may be disposed within the annular step portion. According to this preferable configuration, the cross-sectional area of a magnetic path can be expanded while maintaining compactness of the solenoid casing without forming an unnecessary magnetic path.

It may be preferable that the magnetic material is disposed at a position where the magnetic material always overlaps the movable iron core in a radially directional view. According to this preferable configuration, magnetic fluxes can be effectively induced from one side to the other side between the magnetic material and the movable iron core, and magnetic force loss can be suppressed to expand a cross-sectional area of a magnetic path.

It may be preferable that the magnetic material forms a magnetic body having a ring shape. According to this preferable configuration, a magnetic path having a uniform magnetic flux density in a circumferential direction can be formed.

It may be preferable that the magnetic material forms a plurality of magnetic bodies each having a ring shape. According to this preferable configuration, the cross-sectional area of a magnetic path to be expanded can be adjusted by adjusting the number of the magnetic bodies.

It may be preferable that the magnetic body is externally fitted to a side plate forming the annular step portion of the solenoid casing. According to this preferable configuration, the magnetic body can be axially aligned with the solenoid casing and with the movable iron core located inside, and a magnetic path having a uniform magnetic field strength in the circumferential direction can be formed.

It may be preferable that the magnetic body abuts an end plate forming the annular step portion of the solenoid casing. According to this preferable configuration, the magnetic body can be positioned in the axial direction of the solenoid casing, and the magnetic body can be disposed at a position suitable for inducing more magnetic fluxes from the magnetic material to the movable iron core side.

DESCRIPTION OF EMBODIMENTS

First Embodiment

A solenoid valve according to a first embodiment of the present invention will be described with reference to FIGS. 1 to 7. Hereinafter, the left side of the drawing sheet of FIG. 2 and the right side of the drawing sheet of FIG. 2 will be described as being an upper side of the solenoid valve and a lower side of the solenoid valve, respectively.

A solenoid valve 1 is a spool-type solenoid valve and is used in, for example, a hydraulically controlled device such as an automatic transmission for a vehicle. Incidentally, the solenoid valve 1 is attached to an attachment member such as a valve housing (not illustrated) in a horizontal direction.

Figure 1:
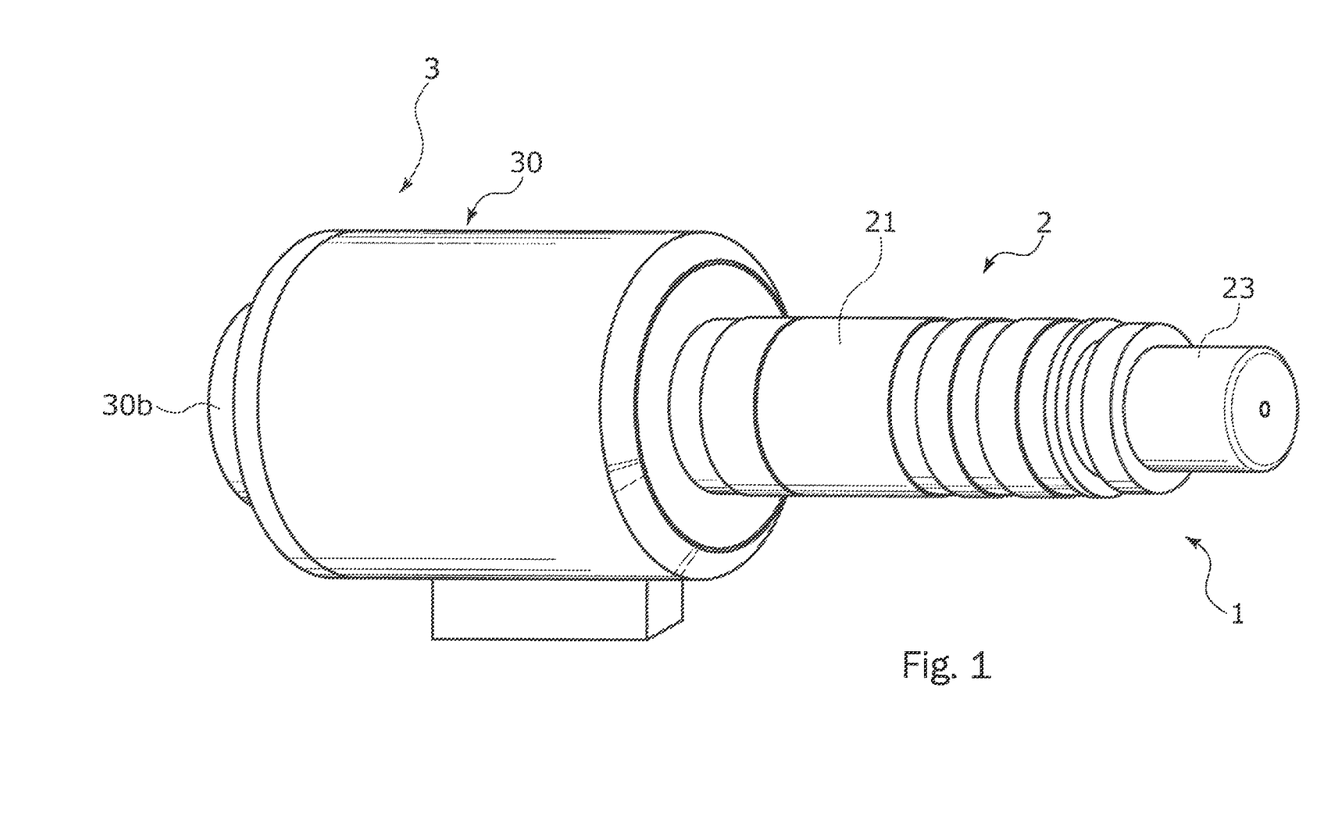
FIG. 1 is a perspective view of a solenoid valve according to a first embodiment of the present invention.
Figure 2:
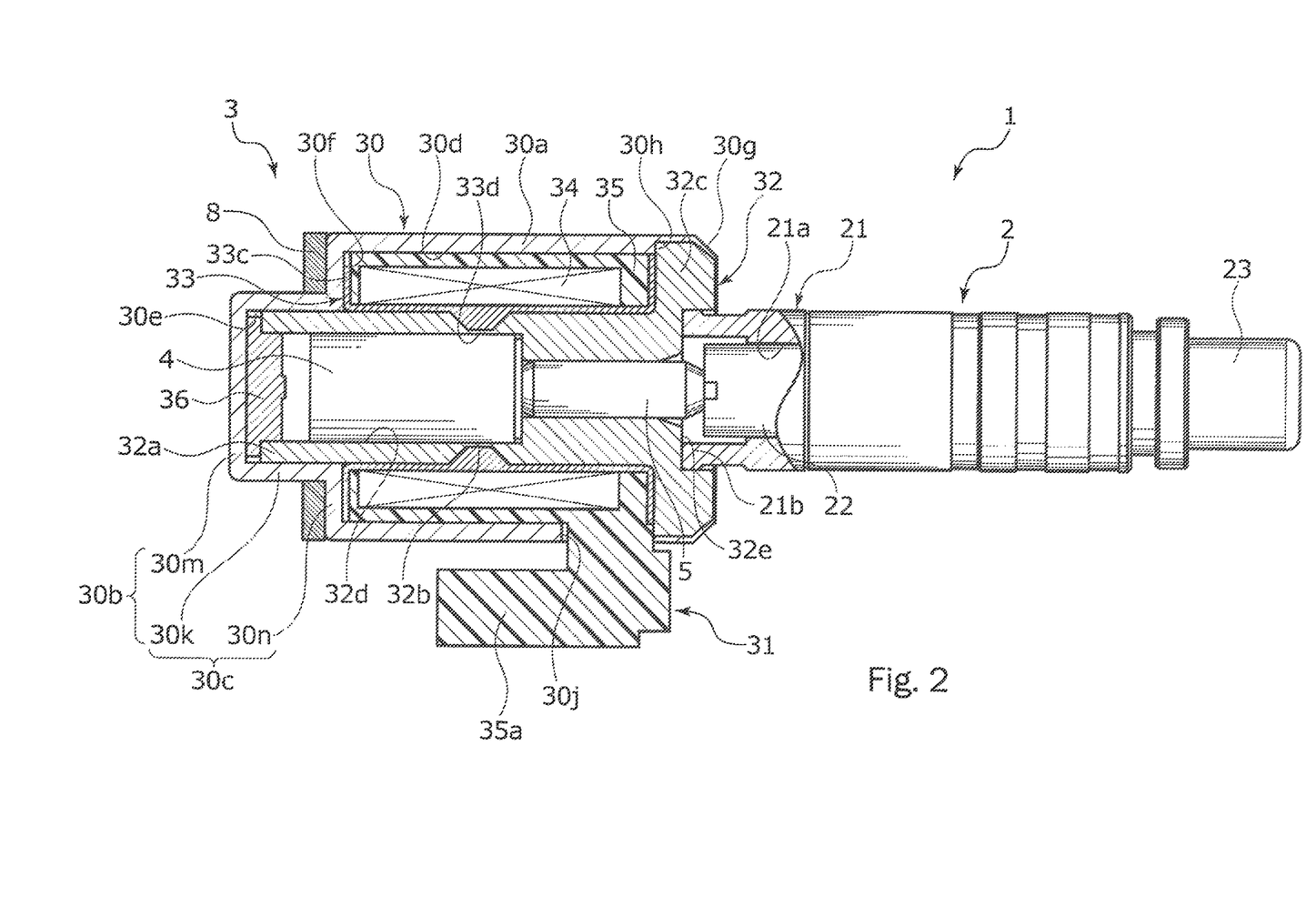
FIG. 2 is a partial cutaway cross-sectional view illustrating a structure of the solenoid valve in the first embodiment.

As illustrated in FIGS. 1 and 2, the solenoid valve 1 is configured such that a valve unit 2 which adjusts a flow rate of a fluid as a valve is integrally attached to a solenoid unit 3 as an electromagnetic drive unit. The solenoid valve 1 adjusts an opening degree of a flow passage on a discharge side. Incidentally, FIG. 2 illustrates a fully open state of an opening degree of a flow passage of the solenoid valve 1 in which a coil 34 of a solenoid molded body 31 is energized.

The valve unit 2 includes a sleeve 21, a spool 22, a spring having a coil shape (not illustrated), a retainer 23. An opening such as an input port or an output port (not illustrated) connected to a flow passage provided inside the valve housing (not illustrated) is provided on an outer periphery of the sleeve 21. The spool 22 is liquid-tightly accommodated in a through-hole 21a of the sleeve 21, and includes a plurality of lands (not illustrated). The spring biases the spool 22 to the left in an axial direction. The retainer 23 is attached to an axially right side of the sleeve 21 and holds the spring. Since this configuration is a well-known configuration as the spool valve, a detailed description thereof will not be repeated. Incidentally, the sleeve 21, the spool 22, and the retainer 23 are made of a material such as aluminum, iron, stainless steel, or resin.

As illustrated in FIG. 2, the solenoid unit 3 mainly includes a solenoid casing 30, the solenoid molded body 31, and a stator 32 as a fixed iron core. The solenoid casing 30 is made of a metal material having a magnetic property such as iron. The solenoid molded body 31 is accommodated in the solenoid casing 30. The stator 32 is disposed inside the solenoid molded body 31.

The solenoid casing 30 is formed into a bottomed tubular shape by pressing a metal plate, and mainly includes a cylindrical portion 30a and a protrusion 30b having a bottomed cylindrical shape. The cylindrical portion 30a covers an outer periphery of the solenoid molded body 31. The protrusion 30b protrudes to the left in the axial direction on an axially left side (namely, the other axial side) of the cylindrical portion 30a, and is formed with a smaller diameter than that of the cylindrical portion 30a. A central axis of the cylindrical portion 30a and a central axis of the protrusion 30b are disposed to substantially coincide with each other. The protrusion 30b includes a bottom plate 30m having a disk shape and a side plate 30k having a cylindrical shape. The side plate 30k is orthogonally continuous with the bottom plate 30m and extends in the axial direction. In addition, an annular step portion 30c that is recessed in a radial direction is formed at an axially left end of the cylindrical portion 30a by the side plate 30k and by an end plate 30n having an annular shape that extends orthogonal to the side plate 30k in a radially outward direction and that is orthogonally continuous with the cylindrical portion 30a. Incidentally, the end plate 30n of the annular step portion 30c serves as a step portion that receives a load in the axial direction when crimping and fixing to be described later is performed.

In addition, an inside of the solenoid casing 30 includes a first accommodating tubular portion 30d and a second accommodating tubular portion 30e. The first accommodating tubular portion 30d is formed by an inner surface of the cylindrical portion 30a, and accommodates the solenoid molded body 31. The second accommodating tubular portion 30e is formed on an axially left side of the first accommodating tubular portion 30d by an inner surface of the protrusion 30b, and an axially left end portion of a cylindrical portion 32a of the stator 32 is inserted into the second accommodating tubular portion 30e. The end plate 30n described above is formed in the radial direction on the axially left side of the first accommodating tubular portion 30d. Namely, the end plate 30n of the annular step portion 30c of the solenoid casing 30 is formed outside the cylindrical portion 32a of or a thin portion 32b to be described later of the stator 32 in the radial direction and on a left side thereof in the axial direction.

In addition, a claw portion 30g is formed at one axial end of the solenoid casing 30. The claw portion 30g is formed thin within a predetermined range from an opening end 30p (refer to FIG. 3) on an axially right side of the cylindrical portion 30a to the left in the axial direction. Incidentally, an annular surface portion 30h extending toward a radially inner side in the radial direction is formed on an axially left side of the claw portion 30g at an axially right end portion of the cylindrical portion 30a. The annular surface portion 30h is orthogonally continuous with an inner surface of the first accommodating tubular portion 30d on a radially inner side of the annular surface portion 30h.

As illustrated in FIG. 2, the stator 32 is formed in a flanged cylindrical shape including the cylindrical portion 32a and a flange portion 32c. The flange portion 32c extends in the radial direction at an axially right end portion of the cylindrical portion 32a. In addition, a through-hole 32d capable of accommodating a plunger 4 as a movable iron core and a rod 5 is formed at a radial center of the cylindrical portion 32a. A holder 36 made of resin or the like is attached to an opening end on an axially left side of the cylindrical portion 32a. Incidentally, an axially left end surface of the holder 36 attached to the opening end on the axially left side of the cylindrical portion 32a is provided to be slightly separated from the bottom plate 30m of the protrusion 30b of the solenoid casing 30, so that a gap is formed therebetween in the axial direction.

In addition, the cylindrical portion 32a of the stator 32 is provided with the thin portion 32b. The thin portion 32b is formed with a thin thickness by recessing a substantially axial center of an outer peripheral surface to the radially inner side over a circumferential direction so as to have an isosceles trapezoidal shape in a cross-sectional view.

The flange portion 32c of the stator 32 is provided with a recessed portion 32e. The recessed portion 32e is recessed to the left in the axial direction at a radial center of an axially right end surface of the flange portion 32c. In addition, an attaching portion 21b of the sleeve 21 is attached and fixed to the recessed portion 32e in an inserted state. Incidentally, an outer peripheral edge of the axially right end surface of the flange portion 32c is subjected to chamfering.

In addition, the flange portion 32c of the stator 32 is fixed to the solenoid casing 30. Specifically, in a state where an outer peripheral edge portion of an axially left end surface of the flange portion 32c abuts the annular surface portion 30h formed on a radially inner side of the axially right end portion of the cylindrical portion 30a of the solenoid casing 30, the solenoid casing 30 is fixed to the flange portion 32c by crimping the claw portion 30g along a chamfered portion 32f (refer to FIG. 3) formed at the outer peripheral edge of the axially right end surface of the flange portion 32c described above. Incidentally, a method for crimping and fixing the stator 32 and the solenoid casing 30 will be described later in detail.

As illustrated in FIG. 2, the solenoid molded body 31 mainly includes a bobbin 33 and the coil 34. The bobbin 33 is provided on a radially outer side of the cylindrical portion 32a of the stator 32. The coil 34 is wound around a radially outer side of the bobbin 33. The solenoid molded body 31 is formed by molding the bobbin 33 and the coil 34 with resin 35. In addition, a control electric current is supplied to the coil 34 from a connector of a connector portion 35a extending to the outside from an opening portion 30j provided on a radially lower side of the solenoid casing 30. Incidentally, the bobbin 33 is made of an insulator such as resin having high rigidity or ceramic, and is integrally molded with the stator 32.

Figure 3:
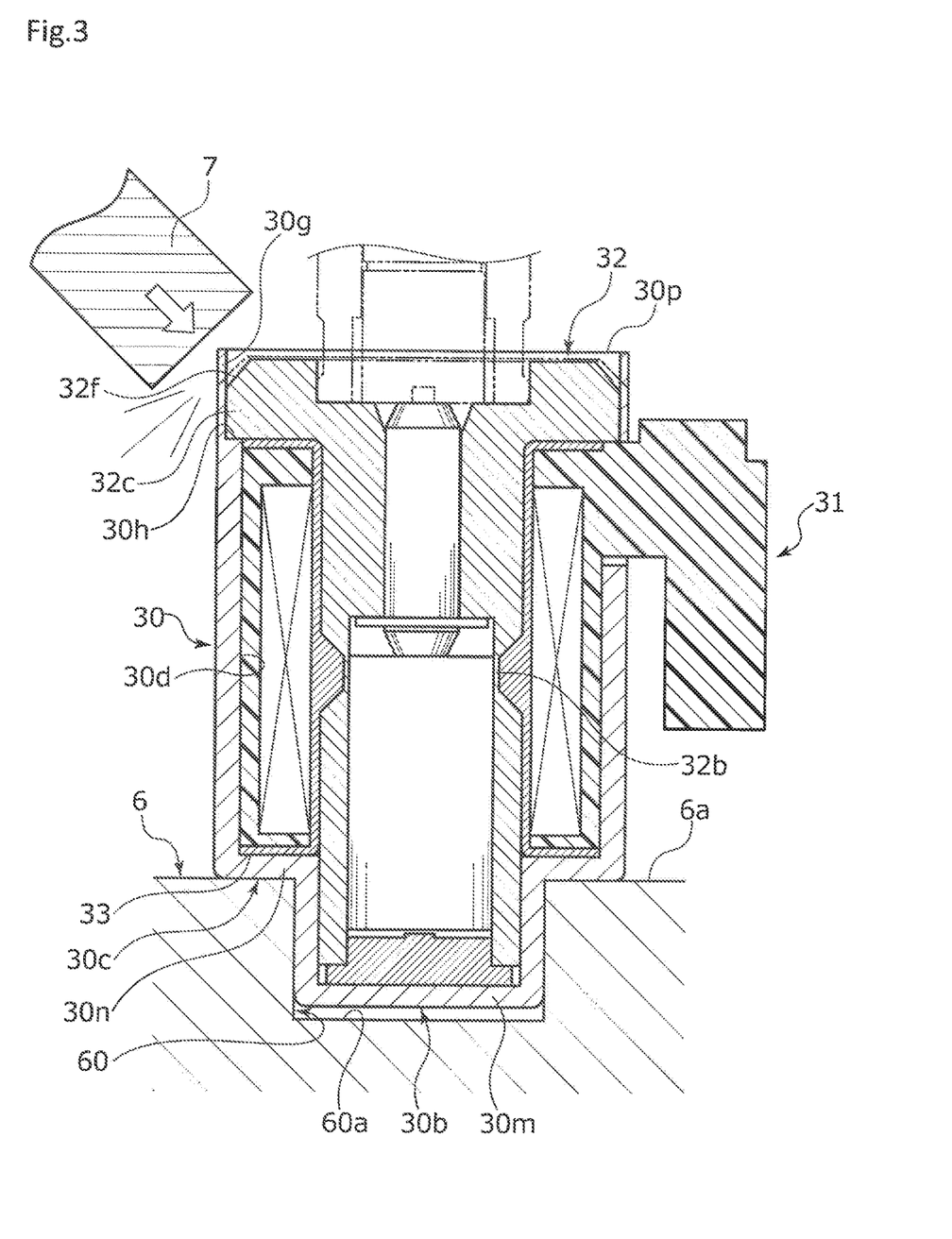
FIG. 3 is a partial cutaway cross-sectional view illustrating a method for crimping and fixing a stator and a solenoid casing using a crimping jig in the first embodiment.

As illustrated in FIG. 3, the stator 32 and the solenoid casing 30 are crimped and fixed to each other by hitting the claw portion 30g of the solenoid casing 30 along the chamfered portion 32f formed at an outer peripheral edge of an axial upper end surface of the flange portion 32c of the stator 32, with a hitting rod 7, in a state where the protrusion 30b of the solenoid casing 30 is inserted from above into a recessed portion 60 provided in a hitting base 6. The recessed portion 60 of the hitting base 6 is formed with substantially the same diameter as that of the protrusion 30b of the solenoid casing 30, and a depth of the recessed portion 60 in the axial direction is formed larger than a protrusion amount of the protrusion 30b of the solenoid casing 30.

In such a manner, when the claw portion 30g of the solenoid casing 30 is crimped to the flange portion 32c of the stator 32, a load acting in the axial direction is received by the end plate 30n of the annular step portion 30c that is provided on the other axial side of the solenoid casing 30 and outside the cylindrical portion 32a (thin portion 32b) of the stator 32 in the radial direction, so that the load in the axial direction is unlikely to be applied to the thin portion 32b of the stator 32 inside the solenoid casing 30. For this reason, the thickness of the thin portion 32b of the stator 32 can be made thinner.

In addition, when a magnetic path is formed by the energization of the coil 34 in an on state of the solenoid valve 1, magnetic resistance at the thin portion 32b of the stator 32 is further increased by making the thickness of the thin portion 32b of the stator 32 very thin. For this reason, magnetic fluxes around the thin portion 32b are biased to a plunger 4 side, so that magnetic force acting on the plunger 4 can be increased.

Further, as illustrated in FIG. 2, on a radially inner side of the annular step portion 30c formed at an axially left end portion of the solenoid casing 30, the axially left end portion of the cylindrical portion 32a of the stator 32 is internally fitted to the second accommodating tubular portion 30e formed inside the protrusion 30b protruding to the left in the axial direction, so that the axially left end portion of the cylindrical portion 32a of the stator 32 can be disposed adjacent to and in contact with the side plate 30k of the protrusion 30b of the solenoid casing 30 in the radial direction. For this reason, magnetic fluxes with reduced magnetic resistance are secured between the annular step portion 30c of the solenoid casing 30 and the axially left end portion of the cylindrical portion 32a of the stator 32, to further increase the magnetic force acting on the plunger 4.

The cylindrical portion 32a of the stator 32 is formed long to the extent that the axially left end portion of the cylindrical portion 32a of the stator 32 can be accommodated in the second accommodating tubular portion 30e formed inside the protrusion 30b of the solenoid casing 30, so that a circle of magnetic fluxes on an outer periphery of the coil 34 can be made large. For this reason, a high magnetic force can be applied to the plunger 4.

Figure 4:
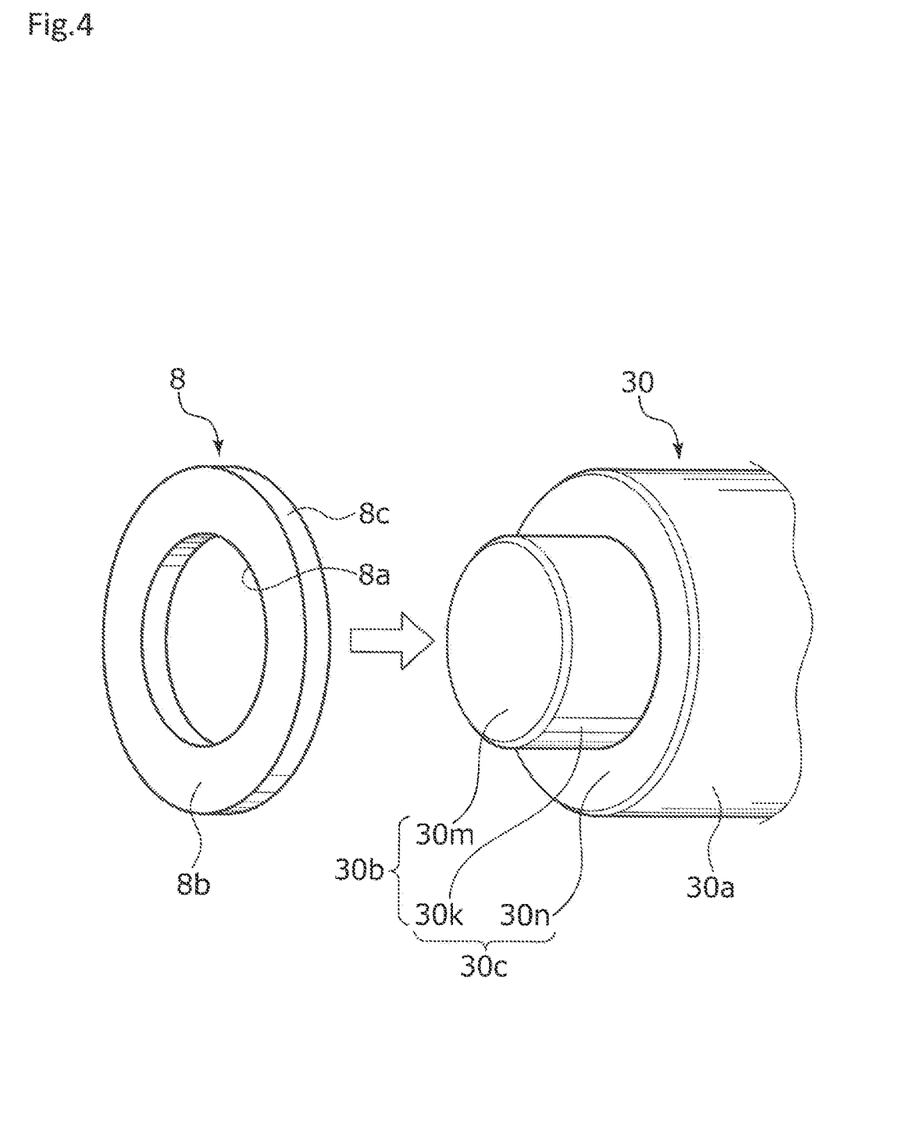
FIG. 4 is a perspective view illustrating a magnetic body to be attached to the solenoid casing in the first embodiment.

Next, a magnetic body 8 to be attached to the solenoid casing 30 will be described. As illustrated in FIGS. 2 and 4, the magnetic body 8 is formed in a ring shape including a uniform thickness and a through-hole 8a at a center of the magnetic body 8. In addition, the magnetic body 8 is made of metal or an alloy consisting of mainly a magnetic material such as iron. The magnetic body 8 is formed such that an inner diameter of the through-hole 8a is slightly smaller than an outer diameter of the side plate 30k having a cylindrical shape and forming the protrusion 30b of the solenoid casing 30, and is press-fitted and fixed to the side plate 30k having a cylindrical shape.

The magnetic body 8 is press-fitted until one surface 8b of front and back surfaces abuts an outer surface of the end plate 30n having an annular shape (namely, a large-diameter surface of a root portion of the protrusion 30b). Accordingly, magnetic fluxes are easily induced from the end plate 30n to the magnetic body 8.

In addition, an outer diameter dimension of an outer peripheral surface 8c of the magnetic body 8 is substantially the same as an outer diameter dimension of the cylindrical portion 30a of the solenoid casing 30. In other words, the magnetic body 8 is disposed to be accommodated within the annular step portion 30c. Accordingly, the solenoid valve 1 can be compactly configured.

In addition, the magnetic body 8 is disposed at an axial end portion of the coil 34. Particularly, from the viewpoint of inducing magnetic fluxes, it is preferable that at least a part of the magnetic body 8 is disposed at an axial end portion of a winding portion of the coil 34. In addition, needless to say, the axial end portion of the coil 34 includes the vicinity of an axial end of the coil 34.

In addition, the magnetic body 8 is disposed at a position where the magnetic body 8 always overlaps the plunger 4 in the radial direction regardless of whether the plunger 4 is energized or not.

Magnetic fluxes generated by the coil 34 pass through a valve unit 2 side of the cylindrical portion 32a of the stator 32, through the flange portion 32c, through the cylindrical portion 30a of the solenoid casing 30, through the end plate 30n, through the magnetic body 8, through a part of the side plate 30k having a cylindrical shape, through a side of the cylindrical portion 32a of the stator 32 opposite the valve unit 2, and through the plunger 4. Incidentally, since the thin portion 32b of the stator 32 has a very small cross-sectional area, almost no magnetic flux passes through the thin portion 32b. Accordingly, opposite magnetic poles are generated at a portion where the plunger 4 and the valve unit 2 side of the stator 32 face each other, a thrust of the plunger 4 is generated by a magnetic attraction thereof, and the plunger 4 moves to the valve unit 2 side.

If the magnetic body 8 is not mounted on the protrusion 30b, the structure is such that the end plate 30n of the solenoid casing 30 has a thin plate shape, a cross-sectional area forming a magnetic path decreases in a radially inward direction from a connecting portion between the end plate 30n and the side plate 30k having a cylindrical shape, namely, from a bent portion formed by pressing, and a saturation magnetic flux density gradually decreases. Namely, when a high electric current is applied to the coil 34 particularly under an environment where the plunger 4 requires a large thrust, sufficient magnetic fluxes cannot be secured at that location. For this reason, when the saturation magnetic flux density is exceeded at that location, a magnetic flux density of the magnetic path that magnetically attracts the plunger 4 and the valve unit 2 side of the stator 32, namely, a thrust to move the plunger 4 to the valve unit 2 side of the stator 32 decreases with respect to the applied electric current value. Namely, the applied electric current value and the thrust of the plunger 4 are not proportional to each other, and it may not be possible to secure a thrust required to move the plunger 4 for the accurate adjustment of the flow rate to be controlled on the valve unit 2 side.

In the solenoid valve 1 according to the present embodiment, the magnetic body 8 is mounted within the annular step portion 30c. Incidentally, the one surface 8b of the front and back surfaces of the magnetic body 8 and the outer surface of the end plate 30n of the solenoid casing 30 abut each other, an inner peripheral surface of the through-hole 8a of the magnetic body 8 and an outer peripheral surface of the side plate 30k having a cylindrical shape of the solenoid casing 30 abut each other; however, a coating film for protection (not illustrated here) is formed on an outer surface of each of the solenoid casing 30 and the magnetic body 8, and materials of ferromagnetic bodies forming the magnetic body 8 and the solenoid casing 30 are not in direct contact with each other, but are in very close proximity since the members abut each other, and there is very little loss of a magnetic field strength at the separation of these materials of the ferromagnetic bodies.

Figure 5:
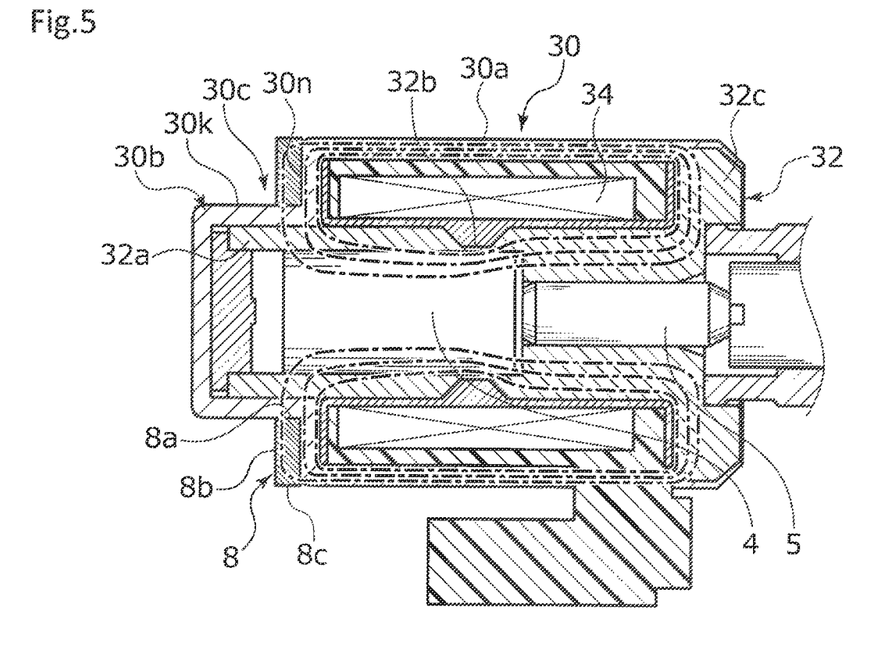
FIG. 5 is a partial cutaway cross-sectional view schematically illustrating magnetic fluxes generated in a coil in a state where a plunger has moved most to a valve unit side in the first embodiment.

FIG. 5 illustrates the moment when a high electric current is applied to the coil 34 and the plunger 4 has moved most to the valve unit 2 side, and schematically illustrates magnetic force lines (namely, magnetic fluxes) of a magnetic field generated in the coil 34 in that state, the electric current being applied to the coil 34. As illustrated in FIG. 5, the magnetic fluxes generated by the coil 34 pass through a magnetic path formed by the valve unit 2 side of the cylindrical portion 32a of the stator 32, the flange portion 32c, the cylindrical portion 30a of the solenoid casing 30, the end plate 30n, the magnetic body 8, a part of the side plate 30k having a cylindrical shape, the side of the cylindrical portion 32a of the stator 32 opposite the valve unit 2, and the plunger 4.

The magnetic body 8 is disposed on the end plate 30n of the solenoid casing 30 and on the connecting portion between the end plate 30n and the side plate 30k having a cylindrical shape, namely, on the bent portion formed by pressing so as to overlap the end plate 30n and to abut the side plate 30k having a cylindrical shape. When the magnetic body 8 is disposed at that location, a cross-sectional area forming the magnetic path at that location is expanded and the saturation magnetic flux density is increased compared to when the magnetic body 8 is not mounted. Namely, even when a high electric current value is applied to the coil 34 particularly under an environment where a large thrust is required to move the plunger 4 to the valve unit 2 side of the stator 32, regarding magnetic fluxes generated by the coil 34, sufficient magnetic fluxes proportional to the electric current value can be secured at that location, and a thrust sufficient to move the plunger 4 can be obtained for the applied electric current.

In addition, in the related art, generally, the load of the spring that biases the spool 22 to the left in the axial direction is lowered under an environment where a large thrust is required to move the plunger to the valve unit side of the stator. However, in this case, the case of a low electric current value is also affected by the lowering of the load of the spring, and it is difficult to finely adjust the opening degree according to the current value. On the other hand, in the present embodiment, the magnetic body 8 is disposed to increase saturation magnetic flux density of a magnetic path and to obtain a magnetic field strength proportional to a high electric current value, so that the magnetic field strength can be finely adjusted according to the electric current value. Namely, it is possible to secure a thrust required to move the plunger 4 for the accurate adjustment of the flow rate to be controlled on the valve unit 2 side.

In addition, although not illustrated here, a magnetic field generated in the coil 34 by energization forms a closed curved surface shape with respect to the coil 34 having a cylindrical shape. Then, the magnetic body 8 including a ferromagnetic body is disposed in the vicinity of the axial end portion of the coil 34 opposite the valve unit 2 side, and forms a magnetic path along the closed curved surface shape of the magnetic field generated in the coil 34, together with the solenoid casing 30, the plunger 4, and the stator 32. According to this configuration, the saturation magnetic flux density is increased by an extent equivalent to a cross-sectional area of the magnetic body 8 particularly at the end plate 30n and at the side plate 30k on a bottom portion side of the solenoid casing 30 having a small thickness.

In addition, since the magnetic body 8 is formed in a ring shape, a magnetic path having a uniform magnetic flux density in the circumferential direction can be formed.

In addition, the magnetic body 8 is disposed within the annular step portion 30c formed on the side of the solenoid casing 30 opposite the valve unit 2, and is located within an outer diameter dimension of and within an axial dimension of the solenoid casing 30, so that the cross-sectional area of a magnetic path can be expanded while maintaining compactness of the solenoid casing 30 without forming an unnecessary magnetic path.

Figure 6:
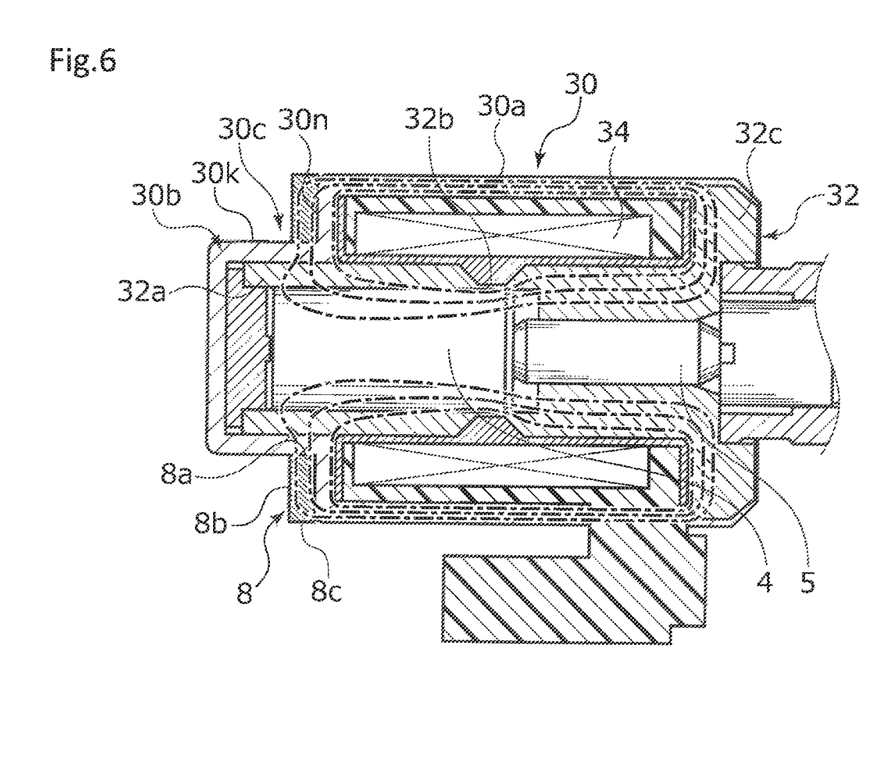
FIG. 6 is a partial cutaway cross-sectional view schematically illustrating magnetic fluxes generated in the coil in a state where the plunger has moved most to a side opposite a valve unit in the first embodiment.

In addition, the magnetic body 8 is disposed outside the plunger 4 in the radial direction at a position where the magnetic body 8 always overlaps the plunger 4 within a stroke range of the plunger 4 from a state where the plunger 4 is located closest to the valve unit 2 side as illustrated in FIG. 6 to a state where the plunger 4 is located on the farthest side from the valve unit 2 (namely, on the bottom portion side of the solenoid casing 30) as illustrated in FIG. 5. According to this configuration, magnetic fluxes can be effectively induced from one side to the other side between the magnetic body 8 and the plunger 4, and magnetic force loss can be suppressed to secure a magnetic flux density of a magnetic path.

In addition, the magnetic body 8 is externally fitted to the outer peripheral surface of the side plate 30k having a cylindrical shape and forming the annular step portion 30c of the solenoid casing 30. According to this configuration, the magnetic body 8 and each of the solenoid casing 30 and the plunger 4 located inside can be axially aligned with each other, and a magnetic path having a uniform magnetic field strength in the circumferential direction can be formed.

In addition, since the one surface 8b of the front and back surfaces of the magnetic body 8 abuts the outer surface of the end plate 30n forming the annular step portion 30c of the solenoid casing 30, the magnetic body 8 can be positioned in the axial direction of the solenoid casing 30, and the magnetic body 8 can be reliably disposed at a position suitable for obtaining a required magnetic field strength.

Figure 7:
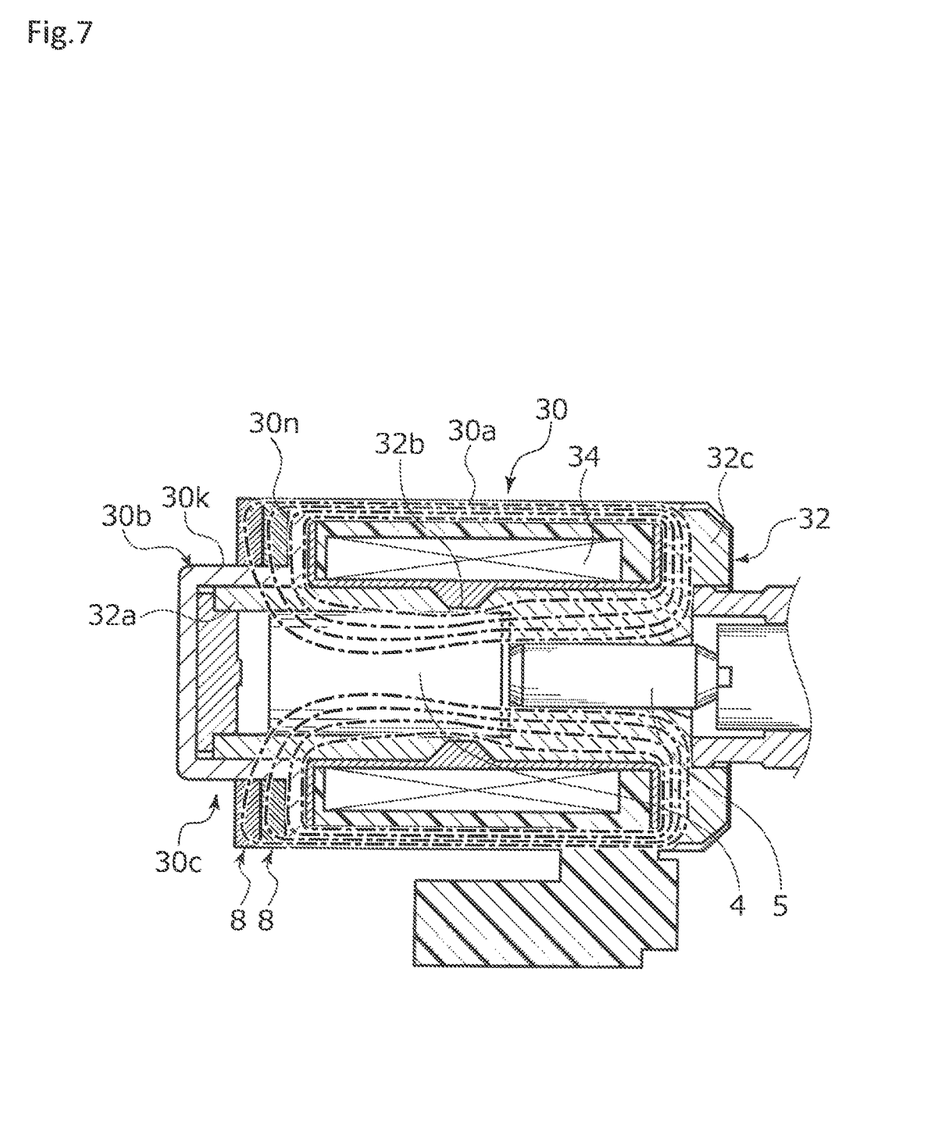
FIG. 7 is a partial cutaway cross-sectional view schematically illustrating magnetic fluxes in a state where an electric current value is applied to the coil in the first embodiment when two magnetic bodies are attached.

In addition, in FIG. 7, two magnetic bodies 8 are attached within the annular step portion 30c. According to this configuration, at the end plate 30n of the solenoid casing 30 having a configuration in which a cross-sectional area forming a magnetic path gradually decreases, the cross-sectional area of the magnetic path at that location is expanded by an extent equivalent to a thickness of the two magnetic bodies 8 and 8. Therefore, even when a higher electric current value is applied, more magnetic fluxes can be induced from the magnetic bodies 8 and 8 to the plunger 4 side, and a thrust of the plunger 4 that is proportional to the applied electric current value can be obtained. Namely, the number of the magnetic bodies 8 attached within the annular step portion 30c is adjusted according to a maximum value of an applied electric current value, so that a thrust of the plunger 4 that is proportional to the electric current value can be obtained.

As described above, the magnetic body 8 that is a separate body is disposed outside the solenoid casing 30, and the magnetic material is changed according to a maximum value of an electric current value applied to the coil 34, so that the magnetic flux density can be adjusted without changing a shape of the solenoid casing 30. Incidentally, instead of adjusting the number of the same magnetic bodies 8, the magnetic flux density can also be adjusted, for example, by preparing a plurality of magnetic bodies having different thicknesses and by replacing the magnetic bodies.

The embodiment of the present invention has been described above with reference to the drawings, but the specific configuration is not limited to the embodiment, and the present invention also includes changes or additions that are made without departing from the scope of the present invention.

For example, in the stator 32 of the embodiment, the flange portion 32c and the cylindrical portion 32a are continuous with the valve unit 2 side and with the side opposite the valve unit 2 via the thin portion 32b, and are located outside the plunger 4 in the radial direction, but the present invention is not limited to this configuration, and for example, the stator that is a fixed iron core may be located only on the valve unit 2 side in the axial direction of the plunger.

In addition, the magnetic body 8 may be fixed within the annular step portion 30c by an adhesive agent or the like instead of being externally fitted to the side plate 30k having a cylindrical shape and forming the annular step portion 30c. Similarly, the magnetic body 8 may be fixed within the annular step portion 30c by an adhesive agent or the like in a state where the magnetic body 8 is separated from the end plate 30n forming the annular step portion 30c.

In addition, the magnetic body 8 may be fixed within the annular step portion 30c by an adhesive agent or the like instead of being externally fitted to the side plate 30k having a cylindrical shape and forming the annular step portion 30c. Similarly, the magnetic body 8 may be fixed within the annular step portion 30c by an adhesive agent or the like without abutting the end plate 30n forming the annular step portion 30c.

In addition, the outer diameter dimension of the outer peripheral surface 8c of the magnetic body 8 may be smaller than the outer diameter dimension of the cylindrical portion 30a of the solenoid casing 30.

In addition, a cross-sectional shape of the magnetic body 8 is not limited to a rectangular shape as in the embodiment, and is preferably a shape of which the cross-sectional area through which magnetic fluxes pass does not decrease toward the radially inner side. In addition, the magnetic body 8 preferably has a right triangular shape or a trapezoidal shape in a cross-sectional view in which the surface facing the end plate 30n is orthogonal to the axial direction, since there is no magnetic loss.

In addition, an example has been described in which the solenoid casing 30 of the embodiment has a bottomed shape in which the bottom plate 30m is a disk shape, but the solenoid casing 30 may have a bottomed shape in which the bottom plate has a through-hole in the axial direction.

In addition, in the embodiment, a magnetic material is processed into a ring shape to form the magnetic body 8, but the present invention is not limited to this configuration, and for example, resin containing a magnetic material may be molded into a ring shape and press-fitted to the annular step portion 30c of the solenoid casing 30.

In addition, in the embodiment, the spool-type solenoid valve using the spool as a valve body has been described, but the present invention is not limited to this configuration, and may be applied to a solenoid valve using a globe valve, a gate valve, or the like.

REFERENCE SIGNS LIST

1 Solenoid valve
2 Valve unit
3 Solenoid unit
4 Plunger (movable iron core)
5 Rod
8 Magnetic body (magnetic material)

8a Through-hole
8b Surface
8c Outer peripheral surface
21 Sleeve
22 Spool
23 Retainer
30 Solenoid casing
30a Cylindrical portion
30b Protrusion
30c Annular step portion (step portion)
30d First accommodating tubular portion
30e Second accommodating tubular portion
30f Annular surface portion
30k Side plate
30n End plate
31 Solenoid molded body
32 Stator (fixed iron core)
32a Cylindrical portion
32b Thin portion
32c Flange portion
33 Bobbin
34 Coil

The invention claimed is:

1. A solenoid valve, comprising:
a movable iron core that is movable in an axial direction;
a solenoid molded body disposed outside the movable iron core in a radial direction and including a coil;
a solenoid casing configured to accommodate the movable iron core and the solenoid molded body;
a fixed iron core disposed inside the solenoid molded body in the radial direction configured to generate a magnetic force between the fixed iron core and the movable iron core when the coil is energized; and
a valve unit configured to open and close a flow passage in accordance with a movement of the movable iron core,
wherein a magnetic material separate from the solenoid casing is disposed at an axial end portion of the coil outside the solenoid casing, and
wherein an annular step portion recessed in a radially inward direction is formed in an outer portion of the solenoid casing at the axial end portion of the coil, and the magnetic material is disposed within the annular step portion.

2. The solenoid valve according to claim 1,
wherein the magnetic material is disposed at a position where the magnetic material always overlaps with the movable iron core in a radially directional view.

3. The solenoid valve according to claim 1,
wherein the magnetic material forms a magnetic body having a ring shape.

4. The solenoid valve according to claim 1,
wherein the magnetic material forms a plurality of magnetic bodies each having a ring shape.

5. The solenoid valve according to claim 3,
wherein the magnetic body is externally fitted to a side plate forming the annular step portion of the solenoid casing.

6. The solenoid valve according to claim 3,
wherein the magnetic body abuts an end plate forming the annular step portion of the solenoid casing.

7. The solenoid valve according to claim 2,
wherein the magnetic material forms a magnetic body having a ring shape.

8. The solenoid valve according to claim 2,
wherein the magnetic material forms a plurality of magnetic bodies each having a ring shape.

9. The solenoid valve according to claim 4,
wherein the magnetic body is externally fitted to a side plate forming the annular step portion of the solenoid casing.

10. The solenoid valve according to claim 4,
wherein the magnetic body abuts an end plate forming the annular step portion of the solenoid casing.

11. The solenoid valve according to claim 7,
wherein the magnetic body is externally fitted to a side plate forming the annular step portion of the solenoid casing.

12. The solenoid valve according to claim 5,
wherein the magnetic body abuts an end plate forming the annular step portion of the solenoid casing.

13. The solenoid valve according to claim 8,
wherein the magnetic body is externally fitted to a side plate forming the annular step portion of the solenoid casing.

14. The solenoid valve according to claim 7,
wherein the magnetic body abuts an end plate forming the annular step portion of the solenoid casing.

15. The solenoid valve according to claim 8,
wherein the magnetic body abuts an end plate forming the annular step portion of the solenoid casing.

16. The solenoid valve according to claim 9,
wherein the magnetic body abuts an end plate forming the annular step portion of the solenoid casing.

* * * * *